US011940127B2

(12) United States Patent
Becske et al.

(10) Patent No.: US 11,940,127 B2
(45) Date of Patent: Mar. 26, 2024

(54) LUMINAIRE SYSTEM WITH HOLDER

(71) Applicant: SCHREDER S.A., Brussels (BE)

(72) Inventors: Imre Becske, Budapest (HU); Csaba Horvath, Budapest (HU)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/253,488

(22) PCT Filed: Jun. 18, 2019

(86) PCT No.: PCT/EP2019/066013
§ 371 (c)(1),
(2) Date: Dec. 17, 2020

(87) PCT Pub. No.: WO2019/243331
PCT Pub. Date: Dec. 26, 2019

(65) Prior Publication Data

US 2021/0254822 A1 Aug. 19, 2021

(30) Foreign Application Priority Data

Jun. 18, 2018 (BE) .................................. 2018/5412

(51) Int. Cl.
*F21V 15/01* (2006.01)
*F21V 23/00* (2015.01)
*F21Y 115/10* (2016.01)

(52) U.S. Cl.
CPC .............. *F21V 15/01* (2013.01); *F21V 23/00* (2013.01); *F21Y 2115/10* (2016.08)

(58) Field of Classification Search
CPC .............................. F21V 21/30; F21V 31/005
See application file for complete search history.

(56) References Cited

U.S. PATENT DOCUMENTS

| | | | | |
|---|---|---|---|---|
| 2,536,799 A * | 1/1951 | Divizia | B60Q 3/44 | 200/291 |
| 3,803,400 A * | 4/1974 | Ozawa | B60Q 3/76 | 362/372 |
| 6,707,619 B1 * | 3/2004 | Okuno | G03B 37/00 | 359/694 |

(Continued)

FOREIGN PATENT DOCUMENTS

| | | |
|---|---|---|
| CN | 203784760 U | 8/2014 |
| CN | 206191403 U | 5/2017 |

(Continued)

OTHER PUBLICATIONS

PCT International Search Report and Written Opinion, Application No. PCT/EP2019/066013, dated Jul. 12, 2019, 10 pages.

(Continued)

*Primary Examiner* — Arman B Fallahkhair
(74) *Attorney, Agent, or Firm* — McDonnell Boehnen Hulbert & Berghoff LLP

(57) ABSTRACT

Example embodiments relate to luminaire systems with holders. One embodiment includes a luminaire system. The luminaire system includes a light source. The luminaire system also includes a holder. Further, the luminaire system includes a casing provided with a seat for receiving the holder. The holder is configured for holding a function module. The holder is also configured for being positioned in different positions in the seat.

17 Claims, 4 Drawing Sheets

(56) References Cited

U.S. PATENT DOCUMENTS

| | | | |
|---|---|---|---|
| 7,531,972 B1 | 5/2009 | Worsham et al. | |
| 8,814,393 B2 * | 8/2014 | Froelicher | F21V 33/0012 362/365 |
| 10,309,630 B2 * | 6/2019 | Cadisch | F21S 8/02 |
| 10,626,912 B2 * | 4/2020 | Karai | F16C 11/106 |
| 10,962,167 B2 * | 3/2021 | Karman | F16M 11/14 |
| 11,168,875 B2 * | 11/2021 | Hou | F21S 8/026 |
| 2002/0145871 A1 * | 10/2002 | Yoda | B60Q 3/44 362/241 |
| 2006/0221624 A1 | 10/2006 | Carroll | |
| 2010/0283854 A1 * | 11/2010 | McKaughan | H04N 5/247 348/144 |
| 2012/0263450 A1 * | 10/2012 | Totani | G03B 17/02 396/428 |
| 2012/0321374 A1 * | 12/2012 | Ray | B25B 23/0035 403/111 |
| 2014/0044427 A1 * | 2/2014 | Huang | G08B 13/19626 396/176 |
| 2014/0098548 A1 | 4/2014 | Huang et al. | |
| 2015/0015703 A1 * | 1/2015 | LaFemina | F21V 33/0052 348/143 |
| 2017/0343195 A1 | 11/2017 | Cadisch et al. | |
| 2018/0109704 A1 * | 4/2018 | Gilbert | H04N 5/2252 |

FOREIGN PATENT DOCUMENTS

| | | |
|---|---|---|
| FR | 3048483 A1 | 9/2017 |
| GB | 2517222 A | 2/2015 |
| JP | 2003008954 A | 1/2003 |

OTHER PUBLICATIONS

"GXV3662_HD/FHD User Manual"; Grandstream Networks, Inc.; Nov. 2015.

* cited by examiner

LUMINAIRE SYSTEM WITH HOLDER

CROSS-REFERENCE TO RELATED APPLICATIONS

The present application is a national stage entry of PCT/EP2019/066013 filed Jun. 18, 2019, which claims priority to BE 2018/5412 filed on Jun. 18, 2018, the contents of each of which are hereby incorporated by reference.

FIELD OF INVENTION

The field of invention relates to luminaire systems, in particular outdoor luminaire systems. Particular embodiments relate to luminaire systems with an integrated functional module.

BACKGROUND

Typically, the lighting network of roads and cities provides a convenient infrastructure with a dense implantation to support additional functions other than lighting. For example, luminaire systems with surveillance cameras are placed in critical areas of some cities. In high traffic road sections, there can be particle and/or gas sensors placed on luminaires to track pollution. Many other environmental data can be measured and tracked by the appropriate use of sensor devices by taking advantage of the luminaires presence. Other devices can relay data within a city for example. However, depending on the type of desired function, the entity to aim at in order to achieve this function can be located in a less than ideal direction respective to the location of the corresponding luminaire. One needs a luminaire system with holder taking into account the numerous directions a desired entity can potentially originate from.

Several solutions exist for add-on modules being mounted on luminaires to add a sensing functionality to a luminaire for example. However, luminaires are not uniform in shape across models and thus a mounting support cannot be reliably found for these add-on modules. Additionally, add-on modules increase costs and complexity. Hence there is a need for an easy way to set-up an additional function in a luminaire system allowing adapting to different types of functional modules, and/or luminaire locations.

SUMMARY

The object of embodiments of the invention is to provide a luminaire system that can adapt to predetermined entities originating from different directions depending on the functional modules and/or luminaire locations. More in particular, embodiments of the invention aim to provide a luminaire system which allows for a simple installation of a functional module.

A particular object of embodiments of the invention is to provide a luminaire system that can adapt to sensing signals originating from different directions depending on the sensor device types and/or luminaire locations.

According to a first aspect of the invention, there is provided a luminaire system. The luminaire system comprises:

- a light source;
- a holder;
- a casing provided with a seat for receiving the holder, said holder being configured for holding a functional module, and preferably holding the functional module;
- wherein the holder is configured for being positioned in different positions in the seat.

An existing solution to install sensor devices to luminaires is to provide add-on modules that can be fixed to the corresponding casing including a built-in hinge, for example, to adjust an angle of the sensor device in the add-on module. However it is not always possible to find an appropriate mounting area on the casing and the addition of the add-on module increases costs and is not aesthetically pleasing. This problem is overcome by a luminaire system as defined above.

In embodiments of the invention, the functional module will be held by a holder received in a seat provided to the casing, e.g. a luminaire casing. Providing the seat for the holder to the casing grants several advantages. For example, as above mentioned, the installation of an add-on module dedicated to the sensor device requires the necessary footprint to be available on an external surface of the casing at a position appropriate for the accurate functioning of the sensor device. Providing directly the seat to the casing allows decreasing the footprint required on the external surface of the casing and thus increasing the number of potential locations to place the seat relative to the casing depending on the functional module type, such as a sensor device.

The seat provided to the casing is configured for receiving the holder and to be able to retain the holder. The seat allows for the chosen functional module held by the holder to be able to function accurately, said accurate functioning being dependent of the orientation and/or position of the functional module with respect to an area surrounding the luminaire casing.

The holder is configured for being received and mounted in the seat. The functional module is provided to the holder. Depending on the functional module type and form factor, one can choose an appropriate holder as long as it has a portion compatible to be received by the seat. Due to these features, the installation of a functional module is simplified since it is not constrained to be adapted to a unique holder.

The cooperation of the seat with the holder in a mounted position will define the freedom range of the holder in terms of orientation with respect to the seat. Changing the position of the holder in the seat will make it possible to modify the orientation of the holder and thus the orientation of the functional module provided to it. Depending on the functional module type and the luminaire installation location, it is possible to change the orientation of the holder towards a more suitable one such that the functional module may function more accurately. Changes in the position of the holder relative to the seat may also be accomplished in order to compensate for an installation inaccuracy of the luminaire.

According to an exemplary embodiment, the luminaire system further comprises a sealing means arranged for providing sealing between the holder and the seat in the different positions.

In this way, since the mechanical structure between the holder and the seat, e.g. ball-and-seat structure, is designed to enable a large range of motion of the holder with respect to the seat, ingress from external elements such as dust and moisture is possible in the interstitial space between the seat and the holder. To solve this problem, the sealing means is placed around the holder such that it fills this interstitial space to maintain the sealing of the casing above a predetermined ingress level, more particular at least at an IP 66 (Ingress Protection) rating. In another embodiment, ingress from external elements is prevented by mounting a cover to the casing over both holder and seat with another sealing means surrounding the seat and placed between the cover and the casing surface.

According to a preferred embodiment, the luminaire system further comprises a functional module provided to the holder.

In this manner, the luminaire system is completed with a means to achieve a function. The seat and/or the holder can be selected in function of the functional module. In different embodiments according to the invention, the functional module may be any one of a sensor device configured for sensing signals, an emitting device configured for emitting signals, a receiving device configured for receiving signals, a display device, an advertising surface, a mounting module. The skilled person in the art will understand that the functional module is not limited to the aforementioned examples and that the luminaire system according to the present invention is suitable for other kinds of functional modules.

The general positioning of the seat associated to the holder relative to the casing can also be determined in function of the functional module. For example, a particle sensor may be preferably placed on top of the casing, and a camera may be preferably placed at the bottom of the casing. Tuning of the functional module specific position and/or orientation may be achieved thanks to moving the holder relative to the seat it is provided to. Additionally, depending on the type of functional module, its form factor and functions may differ and thus the holder may be selected to offer matching characteristics, e.g. portions of the holder in different materials, mounting surfaces of different areas.

The functional module may be provided to an external surface of the holder or at least partially within an inner cavity of the holder, or it can be provided to an inner surface of the holder. In another embodiment, more than one functional module may be provided to the holder.

According to an exemplary embodiment, the functional module comprises any one of a sensor device, an emitting device, a display device, a receiving device.

In this manner, devices whose performances are dependent on an orientation of their active parts towards a predetermined entity may function in an improved manner.

In an embodiment where a sensor device is the functional module, the predetermined entities to be sensed may be sensor signals in an area surrounding the luminaire system. The sensor signals may be any one of, but not limited to, the following: luminaire light distribution, ambient light level, particles count, gas concentration, object presence, humidity level, sound level, image, etc.

The sensor device may be any one of, but not limited to, the following: a microphone or other sound sensor, a photo-sensitive sensor, an accelerometer, a wind sensor, a thermometer, an RF sensor, an electromagnetic sensor, a smoke sensor, a dust sensor, an air quality sensor, another type of environmental sensor, a radar- or lidar-based sensor, etc.

In another embodiment, the luminaire system may be fitted with a light-sensitive function, e.g. a photo-sensitive sensor. The photo-sensitive sensor may be an image-capturing device, e.g. a (video) camera, and the seat associated to the holder may be located on the same luminaire face as the face emitting light such that the image-capturing device may be assisted by the light emitted by the luminaire light source when natural light falls below a certain level. In another exemplary embodiment, the photo-sensitive sensor may measure a light level from a surface illuminated by the luminaire such that the light distribution may be evaluated.

The skilled person will understand that many applications can be derived from the use of data captured by the photo-sensitive sensor.

According to a preferred embodiment, the seat comprises a passage having an inner surface extending between an outer end and an inner end, said inner end being adjacent to an inner part of the casing; and either a rotation-symmetrical circumferential inner surface portion of the passage cooperates with a spherical circumferential outer surface portion of the holder, or a spherical circumferential inner surface portion of the passage cooperates with a rotation-symmetrical circumferential outer surface portion of the holder.

In this manner, the functional module provided to the holder may be moved to different positions in order to be orientated in different directions for a higher versatility of the luminaire system. One can consider a basis consisting of three orthogonal axes with one of them coinciding with the central axis of the seat in a neutral position of the holder relative to the seat. The neutral position is defined as the position allowing the maximum range of movements of the holder relative to the seat around the different axes, said axes being rotation axes. Due to the nature of cooperating surface portions, rotation of the holder is allowed around the three orthogonal axes.

To optimize access to predetermined entities coming from different directions depending on the luminaire location, the seat may be provided to the casing such that the central axis of the seat is substantially perpendicular to a corresponding external surface of the casing. Therefore, the seat positioning with respect to the casing has less orientation constraints. In that latter exemplary embodiment, the freedom range of the holder may be defined as a cone with an elliptical section whose main axis coincides with the main axis of the seat. The dimensions of the elliptical section are defined by the mechanical characteristics of the holder associated to the seat. In an embodiment, the holder may be rotated for large positional changes. The versatility of the luminaire system is increased and the usability of the luminaire system is improved for functional modules, such as sensor devices, requiring high directionality. In another embodiment, the holder has a reduced freedom range and the functional module provided to the holder associated to the seat may get its orientation adjusted to compensate for installation inaccuracies.

Depending on the positioning of the seat respective to the inner cavity defined by the casing, the holder may be located at least partially within the casing according to an embodiment. Thus, the external footprint of the functional module associated to the holder is reduced on the external surface of the casing and the aesthetics of the luminaire are improved. Additionally, placing the holder at least partially within the casing improves the protection against environmental elements of the luminaire system. It could also be beneficial to increase the quality of the functioning of certain devices by partially or completely isolating the holder and the associated device from noise. In an embodiment, the seat receiving the holder may be integrated to the casing. In another embodiment, the seat may be mounted to the casing.

According to an exemplary embodiment, the sealing means is provided on the inner surface portion of the passage cooperating with the outer surface portion of the holder.

In this way, sealing of the casing is achieved in different positions of the holder relative to the seat. Depending on the range of the motion of the holder relative to the seat and on the nature of the cooperating surface portion, the sealing means used needs to be adapted. Since the sealing means is provided at the interstitial space between the seat and the holder, efficient prevention of external elements ingress is achieved. Moreover since the sealing means is at a contact surface of the holder and the seat, the holder may be moved while maintaining sealing. In one embodiment, the sealing means is fixed to the cooperating inner surface portion of the passage. In another embodiment, the sealing means is fixed to the cooperating outer surface portion of the holder.

According to a preferred embodiment, the circular circumferential inner surface portion of the passage has a stepped profile; and the sealing means comprises at least one seal provided to at least one step surface of the stepped profile.

In this manner, a flat surface is provided for placing the sealing means which is more practical. Additionally, by having a stepped profile, the points of contact between the seat and the holder are decreased and the ease-of-move of the holder with respect to the seat is increased.

According to an exemplary embodiment, the outer end of the passage is narrower than the inner end of the passage; and a portion of the holder protrudes through the outer end in a mounted position of the holder in the seat.

In this manner, the holder is physically forbidden from passing through the outer end of the passage and thus from falling out of the casing. The seat may be a simple mechanical structure designed in order to prevent what it contains from going past a predetermined point in at least one direction. In the case of the holder, the seat may be designed to prevent the latter from falling out of the casing. Due to the configuration of the inner and outer ends, the passage may define an inner volume capable of allowing the holder to be moved easily within the seat while at the same time retaining the holder at least partially within the casing. The outer end may be defining a convenient opening through which signals may be sensed, emitted, or received by devices. The opening may be a hole in the casing, but may also be covered with a cover in a material transparent to the signals to increase the casing protection against ingress of external elements.

In the present invention, the terms "transparent to the signal(s)", "transparent to predetermined signal(s)" should not be interpreted too restrictively as solely allowing the passage of a light signal but rather as allowing the passage of any type of signal(s) that the functional module aims to detect, emit and/or receive. For example, if the functional module is a photosensitive sensor, the material may be a translucent material; if the functional module is an air quality sensor, a smoke sensor or a gas concentration sensor, the material may be a material permeable to the corresponding particles/elements to be measured; if the functional module is an antenna, the material may be a non-blocking electromagnetic fields/non-faraday material, such as plastic; if the functional module is a sound sensor or sound speaker, the material may be a material permeable to sound, such as perforated plastic or perforated metal.

According to a preferred embodiment, the holder is configured for being rotated in a mounted position of the holder along at least a 20°-arc, preferably at least a 45°-arc, around a first rotating axis, and for being rotated along at least a 20°-arc, preferably at least a 45°-arc, around a second rotating axis.

In this way, the functional module provided to the holder may reach a large number of positions with a wide freedom range. Thus the holder is suitable for numerous types of devices and/or functions requiring being orientated in different directions and/or suitable for reliably orientating the functional module towards an optimal direction for luminaires installed in a great variety of locations.

According to an exemplary embodiment, a portion of the holder is located outside of the casing in a mounted position of the holder.

In this manner, the holder may be more easily manipulated by a user for providing the functional module to the holder, as well as changing the holder from one position to another position. Additionally, the functional module provided to the holder may more easily access to some predetermined entities, such as sensor signals in case the functional module is a sensor device, by being located outside of the casing.

According to a preferred embodiment, the holder has a cavity configured for containing the functional module, said cavity comprising a window configured for being transparent to predetermined signals in a mounted position of the holder.

In this manner, the functional module has additional protection from the holder while still allowing accurate functioning. The window may be chosen in function of the functional module mounted in the cavity, e.g. plastic for an antenna, translucent for a camera, open for a microphone. More than one functional module may be mounted within the holder. Alternatively, one functional module may be mounted within the holder and another functional module may be mounted to an external surface of the holder.

According to an exemplary embodiment, the holder is transparent to predetermined signals.

In this way, the design of the holder is simplified.

According to a preferred embodiment, the luminaire system further comprises a locking means configured for, after having positioned the holder in the seat, locking the positioned holder with respect to the seat.

In this manner, the holder may be immobilized to rest in a stable position. By removing the locking means, one can freely lock and unlock the holder in place. The locking means may be a sphere fixing bezel with a diameter smaller than a maximum outer diameter of the holder if the holder is of spherical shape. In another exemplary embodiment, the locking means may be screws or bolts.

According to an exemplary embodiment, the sealing means includes at least one O-ring, preferably at least two O-rings.

In this manner, the sealing means may consist in standard seals that are easily replaceable and still providing efficient sealing while not restraining the range of different positions available to the holder relative to the seat.

According to a preferred embodiment, the luminaire system further comprises a moving means configured for moving the holder from a first position to a second position.

In this way, the holder may be moved remotely relative to the seat without the direct physical assistance of a user of the luminaire system. The skilled person will understand that many moving means may be envisioned to realize this feature according to the present invention. The control of the moving means may be achieved remotely in a wired way or wirelessly. In another exemplary embodiment, the moving means is further configured for monitoring a position of the holder and for controlling the moving from a first position to a second position based on the monitored position such that a feedback loop is created.

According to a preferred embodiment, the luminaire system further comprises a controller configured for controlling the sensing, emitting, displaying, or receiving of predetermined signals by the functional module, and configured for controlling the light source and/or the moving means based on the sensed, emitted, displayed or received predetermined signals.

In this way, the functional module orientation, the predetermined signals associated to it, and/or the light source may be coordinated to improve the accurate functioning of the functional module. In an exemplary embodiment, the light source may be controlled such that it emits patterned light in reaction to the detection of a specific parameter by the functional module. In another embodiment according to the invention, the sensing accuracy of a sensor device may be improved by scanning through different orientations until an optimal positioning of the functional module associated to the holder is found.

According to an exemplary embodiment, the light source is arranged outside the holder, in or on the casing.

In this way, all elements necessary for the luminaire system may be provided to the casing of a luminaire head, for example. In another embodiment, the light source is located in a housing separate from the casing and the casing may be a part of the support pole and/or in a luminaire module.

Moreover, since the light source is arranged outside the holder, the light source and the holder may be independent from a structural point of view and/or from an operating point of view.

In still another embodiment, the light source may be comprised in a first compartment of the casing and the holder in a second compartment of the casing to allow independent access to the light source and to the holder.

According to a preferred embodiment, the casing is a luminaire casing.

In this manner, the luminaire casing surface area may be improved with extra usability.

According to an exemplary embodiment, the light source is arranged inside the luminaire casing.

In this way, the light source may be protected from foreign elements more easily, and the outer surface of the luminaire casing may be more aesthetically pleasing.

According to a preferred embodiment, the holder is arranged inside the luminaire casing when received by the seat.

In this manner, the holder, and potentially the functional module, may be protected from foreign elements more easily, and the outer surface of the luminaire casing may be more aesthetically pleasing.

In another embodiment, the luminaire system includes: a light source; a holder; a functional module provided to the holder, said holder holding the functional module; a luminaire casing provided with a seat for receiving the holder; wherein the light source is arranged in or on the luminaire casing; wherein the functional module comprises any one of a sensor device, an emitting device, a receiving device, a display device; and wherein the holder is configured for being positioned in different positions in the seat.

In this manner, the main lighting function carried out by the light source in the luminaire, and the supplementary function carried out by the functional module provided to the orientable holder, may be independent functions occupying separate areas on the luminaire casing. Additionally, depending on the nature of the functional module, the holder may be oriented towards or away from the area illuminated by the light source in order to take advantage or avoid the additional light from the light source with respect to the ambient light.

According to an exemplary embodiment, the seat provided to the casing is a seat integral to the casing. In other words, the seat and at least a portion of the casing are made in one piece.

In this way, the seat is mechanically simpler and does not require assembly with the casing. Additionally the seat being integral to the casing, no interstitial space is present between the seat and the casing, thereby preventing ingress of foreign elements to the casing.

In another embodiment, the luminaire system includes: a light source; a holder; a luminaire casing provided with a seat integral to the luminaire casing for receiving the holder, said holder holding a functional module; wherein the holder is configured for being positioned in different positions in the integral seat; wherein the light source is arranged in or on the luminaire casing; and a sealing means arranged for providing sealing between the holder and the integral seat in the different positions.

In this manner, the main lighting function carried out by the light source may be located, and potentially sealed, in a structure away from the holder in the luminaire casing. Moreover, the integration of the seat as part of the luminaire casing, in addition to the sealing means between the holder and the seat, may allow having a luminaire system with an orientable functional module while preserving the water-sealed integrity of the luminaire casing. In one embodiment, the light source may be comprised in a lighting module mounted on the luminaire casing such that, when mounted on the luminaire casing, the lighting module is sealed. In another embodiment, the light source is mounted inside the luminaire casing away from the holder, and emits light through an optical window, said optical window being arranged to the luminaire casing in a sealed manner.

BRIEF DESCRIPTION OF THE FIGURES

This and other aspects of the present invention will now be described in more details, with reference to the appended drawings showing a currently preferred embodiment of the invention. Like numbers refer to like features throughout the drawings.

DESCRIPTION OF EMBODIMENTS

The following paragraphs will reflect a particular embodiment of the functional module being a sensor device for the sake of clarity. However it is to be kept in mind that it is merely an exemplary embodiment and not a limitation of the current invention. In different embodiments according to the invention, the functional module may be any one of a display device, an emitting device configured for emitting signals, a receiving device configured for receiving signals, an advertising surface, a mounting module. The skilled person in the art will understand that the functional module is not limited to the aforementioned examples and that the luminaire system according to the present invention is suitable for other kinds of functional modules.

Figure 1B:
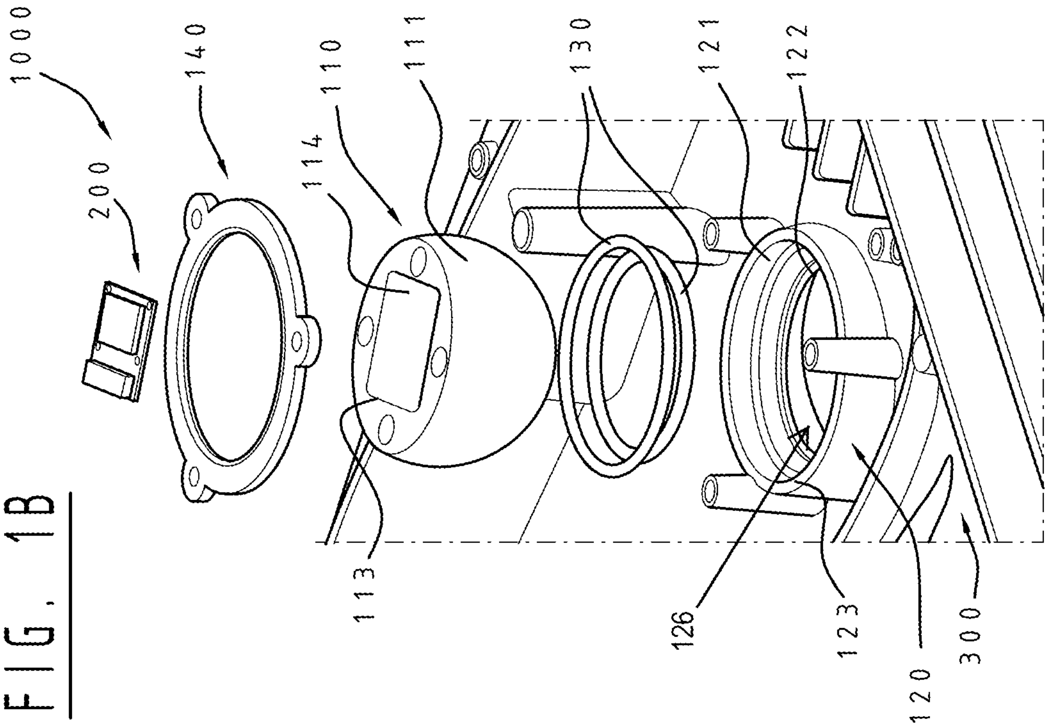
FIGS. 1A and 1 B show a cut side view and a perspective view, respectively, of an exemplary embodiment of a luminaire system according to the invention.
Figure 1A:
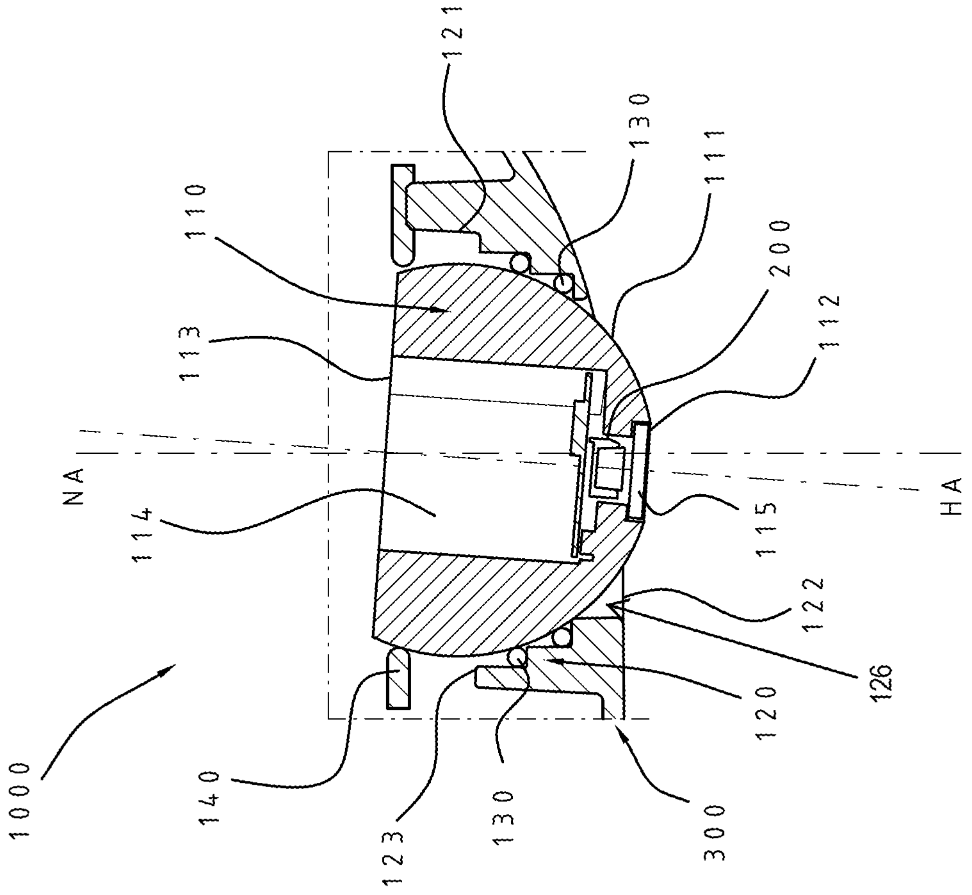

FIGS. 1A and 1B show a cut side view and a perspective view, respectively, of an exemplary embodiment of a luminaire system according to the present invention. The luminaire system 1000 may be for outdoor luminaires. It comprises a casing 300 provided with a seat 120 and a holder 110.

The casing 300 is provided with the seat 120 configured for receiving the holder 110. The sensor device 200 is provided to the holder 110 received in the seat 120. The seat 120 may be provided to a portion of the casing 300 made for example of plastic or metal. The seat 120 may be made in a similar or different material as the casing 300 portion it is provided to, and may be fixed to or integrated in the casing 300. The seat 120 is integrated in the casing 300 in the embodiment of FIGS. 1A-1B. The general location of the seat 120 with respect to the casing 300 may depend on the type of sensor device 200 used. In the embodiment of FIGS. 1A-1B, the seat 120 is provided to a downward face of the casing 300 when mounted. Additionally, the seat 120 may be entirely located within the casing 300 or may be protruding externally.

The seat 120 may be designed for preventing the holder 110 received in the seat 120 from falling out the casing 300 while enabling the sensor device 200 to sense sensor signals. Sensor signals may be related to, but are not limited to, one of the following: the presence and/or concentration of a chemical compound, a number of particles, light levels, light distribution, sound, electromagnetic signals, images. The sensor device 200 may be any one of, but not limited to, the following: a microphone or other sound sensor, a photosensitive sensor, an accelerometer, a wind sensor, a thermometer, an RF sensor, an electromagnetic sensor, a smoke sensor, a dust sensor, an air quality sensor, another type of environmental sensor, a radar- or lidar-based sensor.

To enable the sensor device 200 to sense sensor signals, the seat 120 may have an opening 122 in the external surface of the casing 300. The opening 122 provides access to sensor signals. The opening 122 may simply consists in a hole as in FIGS. 1A-1B, or may in other embodiments comprise cover elements transparent to the sensor signals.

The seat 120 has an inner surface 121 defining a passage 126. The passage 126 may be, for example, a substantially truncated spherical volume for holding the holder 110. The opening 122 may be an outer end of the passage 126 and is opposite an inner end. An axis passing through the center of the outer end and the center of the inner end defines a neutral axis NA of the seat 120. The neutral axis NA may be substantially perpendicular to the external surface of the casing 300 to which the seat 120 is provided. In the embodiment of FIGS. 1A-1B, the passage 126 has an inner stepped profile 121 which is rotation symmetrical with respect to the neutral axis NA. The inner stepped profile 121 comprises successions of concentric surfaces with increasing diameters as seen in an inward direction of the casing 300. The successions of concentric surfaces may be respectively parallel and perpendicular to the neutral axis NA.

The holder 110 is configured to be mounted in the seat 120, more particularly to be mounted in the passage 126 of the seat 120. The holder 110 of FIGS. 1A-1B has a partially spherical external surface 111 and is mounted such that the rotational symmetry axis HA of the holder 110 may coincide with the neutral axis NA of the seat 120 when mounted in a resting position. The holder 110 may have a first end 112 and a second end 113 opposite thereof, such that both ends 112, 113 are truncated ends of the external spherical surface 111, perpendicular to the rotational symmetry axis HA of the holder 110.

The diameter of the external spherical surface 111 is larger than the dimensions of the opening 122, effectively retaining the holder 110 in the casing 300. The curvature of the external spherical surface 111 fits the dimensions of the inner stepped profile 121 for effective cooperation between the holder 110 and the seat 120. The first end 112 of the holder 110 faces an area external to the casing 300 in a mounted position of the holder 110. The second end 113 of the holder 110 faces an internal area of the casing 300 in a mounted position of the holder 110. The first end 112 of the holder 110 passes through the opening 122 of the seat 120 and protrudes out of the external surface of the casing 300 in FIGS. 1A-1B.

The holder 110 may comprise a cavity 114 for mounting the sensor device 200. The cavity 114 may have two opposite open ends at the two truncated ends 112, 113 of the external spherical surface 111. The open end corresponding to the second end 113 of the holder 110 allows the sensor device 200 to be placed in the cavity 114. The open end corresponding to the first end 112 of the holder 110 defines a sensor window. In the embodiment of FIGS. 1A-1B, the cavity 114 extends from the first to the second end 112, 113 of the holder 110.

The cavity 114 may comprise a first and a second volume of different dimensions. In the embodiment of FIGS. 1A and 1B, the first volume extends from the first end 112 and is configured for the sensing element of the sensor device 200 to be able to sense sensor signals. The second volume connected to the first volume extends from the second end 113 and is configured such that the sensor device 200 may be mounted in the cavity 114 from the rear of the holder 110 as seen in an inward direction of the casing 300. Connection wires from the sensor device 200 may pass through the second volume to be connected to other electronic elements provided to the casing 300. In other embodiments according to the invention, the second volume may be a slit to mount the sensor device 200 in the holder 110 in a sideway manner.

In the embodiment of FIGS. 1A-1B, the sensor device 200 is a camera and the open end at the first end 112 of the holder 110 has similar dimensions as the camera's objective. The open end at the first end 112 of the holder 110 may be provided with a cover 115, a glass cover in FIGS. 1A-1B, transparent to the sensor signals. The open end at the first end 112 of the holder 110 is surrounded by the opening 122 of the seat 120.

Two O-rings 130 are provided to surfaces of the inner stepped profile 121 perpendicular to the neutral axis NA in FIGS. 1A-1B as sealing means 130. The two O-rings 130 are in contact with the external spherical surface 111 of the holder 110, thereby providing sealing between the seat 120 and the holder 110. In another exemplary embodiment, only one O-ring may be provided. In still another exemplary embodiment, more than two O-rings may be provided. Due to the cooperation of the external spherical surface 111 of the holder 110 with the inner stepped profile 121, the holder 110 may be positioned in different positions while maintaining the sealing supplied by the two O-rings 130. In another embodiment according to the invention, the opening 122 of the seat 120 is protected by a cover 115 and the sealing is ensured by a sealing means 132 between the cover and the casing external surface, said sealing means surrounding the opening 122 of the seat 120.

The effective range of movements allowed to the holder 110 within the seat 120 is defined by the dimensions of the cooperating surfaces of the holder 110 and the seat 120, by the dimensions of the open end at the first end 112 of the holder 110, and by the dimensions of the opening 122 of the seat 120. Since in FIGS. 1A-1B, the external surface of the holder 110 and the inner surface of the seat 120 are rotation symmetrical, the holder 110 can rotate around the neutral axis NA. Additionally, since the external surface 111 of the holder 110 is partially spherical, and the inner surface 121 of the seat 20 comprises concentric surfaces, the holder 110 may be rotated around two axes orthogonal to the neutral axis NA. Rotation around these two orthogonal axes defines an angular cone representing all the different positions available to a center of the open end at the first end 112 of the holder 110 within the opening 122 of the seat 120. In other words, in the case of the sensor device 200 being a camera, it represents positions where the camera may be moved to while having a line of sight through the opening 122 of the seat 120.

Once moved into position, the holder 110 may have its position fixed by a locking means 140. In FIGS. 1A-1B, this function is ensured by a ring element 140 fixed to the casing 300 by fixing means (not shown), e.g. screws. The ring element 140 has an inner diameter smaller than the diameter or the external spherical surface 111 of the holder 110 in the embodiment of FIGS. 1A and 1B. Therefore, the ring element 140 prevents the holder 110 from leaving its mounted position in the seat 120.

Figure 2A:
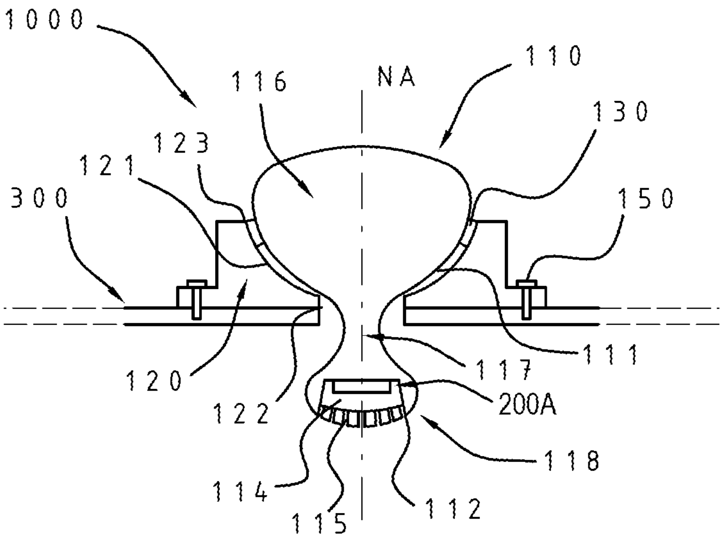
FIGS. 2A and 2B show cut side views of further exemplary embodiments of a luminaire system according to the invention.
Figure 2B:
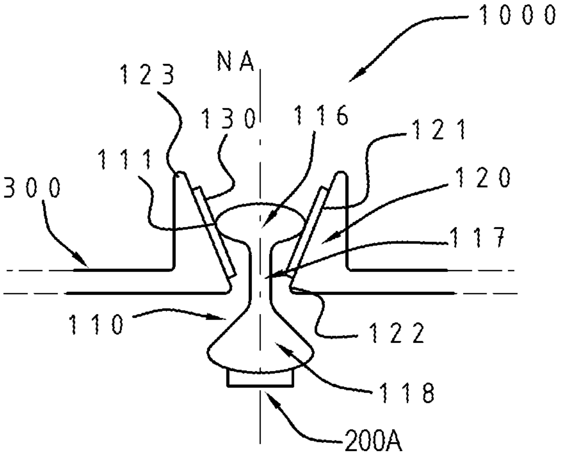

FIGS. 2A and 2B show cut side views of further exemplary embodiments of a luminaire system according to the present invention. The luminaire system 1000 comprises a seat 120 provided to a casing 300 and a holder 110 configured for being received in the seat 120.

In FIG. 2A, the seat 120 provided to the casing 300 is fixed to an inner surface of the casing 300 by fixing means 150. The fixing means 150 may be any one of bolts, screws, glue. The seat 120 has an inner surface 121 configured for receiving the holder 110. The inner surface 121 of the seat 120 is rotation symmetrical around a neutral axis NA of the seat 120 and comprises a spherical portion. The seat 120 presents an opening 122 facing outwardly and coinciding with an opening of the casing 300.

The holder 110 of FIG. 2A comprises three connected portions 116, 117, 118, namely a body portion 116 cooperating with the inner surface 121 of the seat 120, a head portion 118 located out of the casing 300 and configured for hosting a functional module 200A, such as a sensor device, and a neck portion 117 passing through the opening 122 of the seat and the opening of the casing 300 and connecting the body portion 116 to the head portion 118. The body portion 116 has a spherical outer surface 111 cooperating with the spherical inner surface 121 of the seat and is rotation symmetrical in a resting mounted position around the neutral axis NA. The cooperation of the spherical surfaces of the body portion 116 and of the inner surface 121 of the seat 120, respectively, enables the holder 110 to be positioned in different positions. A sealing means 130 surrounds the body portion 117 and is located between the holder 110 and the seat 120 to provide sealing in the different positions of the holder 110. The neck portion 117 has smaller dimensions than the opening 122 of the seat 120 and the opening of the casing 300 in a plane of the opening 122. The neck portion 117 may be connected to a central part of the body portion 116 with respect to the neutral axis NA or may be connected off-center relative to the central part of the body portion 116. The neck portion 117 may extend along the direction of the neutral axis NA in a resting mounted position of the holder 110 or may extend at an oblique angle or in a curved manner with respect to the neutral axis NA. The head portion 118 is provided with a cavity 114 to hold the sensor device 200. The cavity 114 may comprise an open end 112 to enable the functional module 200A, a sensor device located in the cavity 114 in the embodiment of FIG. 2A, to sense sensor signals. The open end 112 of FIG. 2A is closed by a grid-like cover 115 suitable for functional modules 200A requiring an open air access to external elements, e.g. microphone, gas detector.

In FIG. 2B, the seat 120 is rotation symmetrical around the neutral axis NA and has a conical-shaped inner surface 121. The seat 120 is integrated in the casing 300 and has an opening 122 facing outwardly. The holder 110 comprises a body portion 116, a neck portion 117, and a head portion 118. The body portion 116 is rotation symmetrical around the neutral axis NA in a resting mounted position of the holder 110 and has an elliptical profile in a plane comprising the neutral axis NA. The conical inner surface 121 of the seat 120 has an increasing diameter in a plane perpendicular to the neutral axis NA as seen in an inward direction of the casing 300. The opening 122 of the seat 120 has a diameter smaller than the corresponding external diameter of the body portion 116. A conical seal 130 is provided as a sealing means between the body portion 116 and the inner surface 121 of the seat 120 and ensures sealing in different positions of the holder 110 relative to the seat 120. The neck portion 117 is connected to a central part of the body portion 116 and extends outwardly through the opening 122 of the seat 120 along the direction of the neutral axis NA. The neck portion 117 connects the body portion 116 to the head portion 118. The head portion 118 is configured for a functional module 200A, such as a sensor device to be mounted to its external surface.

Figure 3:
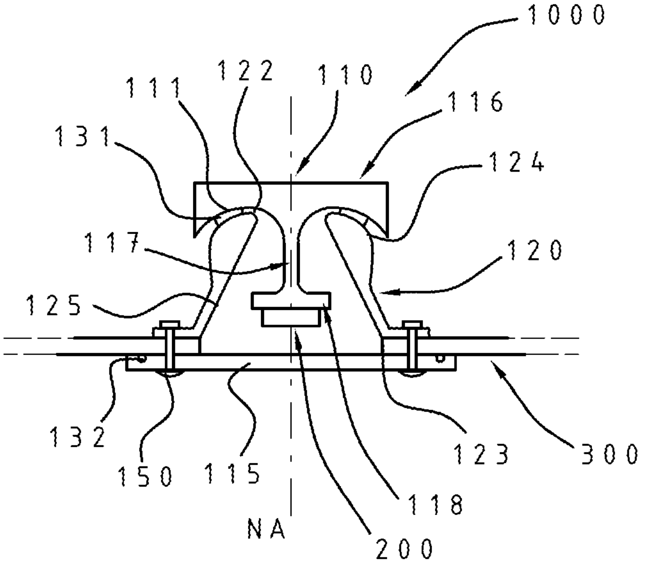
FIG. 3 shows a cut side view of a further exemplary embodiment of a luminaire system according to the invention.

FIG. 3 shows a cut side view of a further exemplary embodiment of a luminaire system according to the present invention. The luminaire system 1000 comprises a seat 120 provided to a casing 300 and a holder 110 configured for being mounted in the seat 120.

The seat 120 is rotation symmetrical around the neutral axis NA and is fixed to an inner surface of the casing 300 by fixing means 150. The seat 120 has a first surface 124 and a second surface 125 opposite the first surface 124. The first surface 124 faces an inward direction of the casing 300 and the second surface 125 faces outwardly. The second surface 125 is a conical-shaped surface defining a truncated conical volume with an inner end 122 and an outer end 123 opposite the inner end 122. The outer end 123 coincides with a similar opening of the casing 300. The second surface 125 is of decreasing diameter as seen in an inward direction of the casing 300. The first surface 124 comprises a spherical-shaped shoulder portion facing inwardly and configured to cooperate with a corresponding spherical-shaped surface of the holder 110. The outer end 123 is covered by a cover 125 comprising a transparent portion and fixed to an external surface of the casing 300 by fixing means 150.

The holder 110 comprises a body portion 116, a neck portion 117, and a head portion 118. The body portion 116 is located behind the inner end 122 of the seat 120 as seen in an inward direction of the casing 300. The body portion 116 comprises a spherical-shaped surface facing the shoulder portion of the first surface 124 of the seat 120 such that it can be placed over the shoulder portion. The cooperation of the spherical-shaped surfaces of the body portion 116 and of the first surface 124 of the seat 120, respectively, enables the holder 110 to be positioned in different mounting positions. The neck portion 117 is connected to a central part of the body portion 116 and passes through the inner end 122 of the seat 120. The head portion 118 is connected to the neck portion 117 and presents an outwardly facing mounting surface configured for mounting a sensor device 200. The holder 110 is designed such that the sensor device 200 associated to the holder 110 is contained in a volume defined by the second surface 125 of the seat 120 and an inner surface of the cover 115. Alternatively, in another embodiment, the holder 110 may protrude from the casing and the sensor device 200 may optionally have an IP66 rate against ingress from external elements.

Sealing of the seat 120 associated with the holder 110 may be achieved with a first sealing means 131 and a second sealing means 132. The first sealing means 131 surrounds the neck portion 117 of the holder 110 and is located between the corresponding spherical surfaces of the body portion 116 of the holder 110 and the shoulder portion of the seat 120. The second sealing means 132 surrounds the first open end 122 of the seat 230 and is located between the cover 115 and the external surface of the casing 300. In another embodiment, the sealing is achieved only with the second sealing means 132. In still another embodiment, the sealing is achieved only with the first sealing means 131.

Figure 4A:
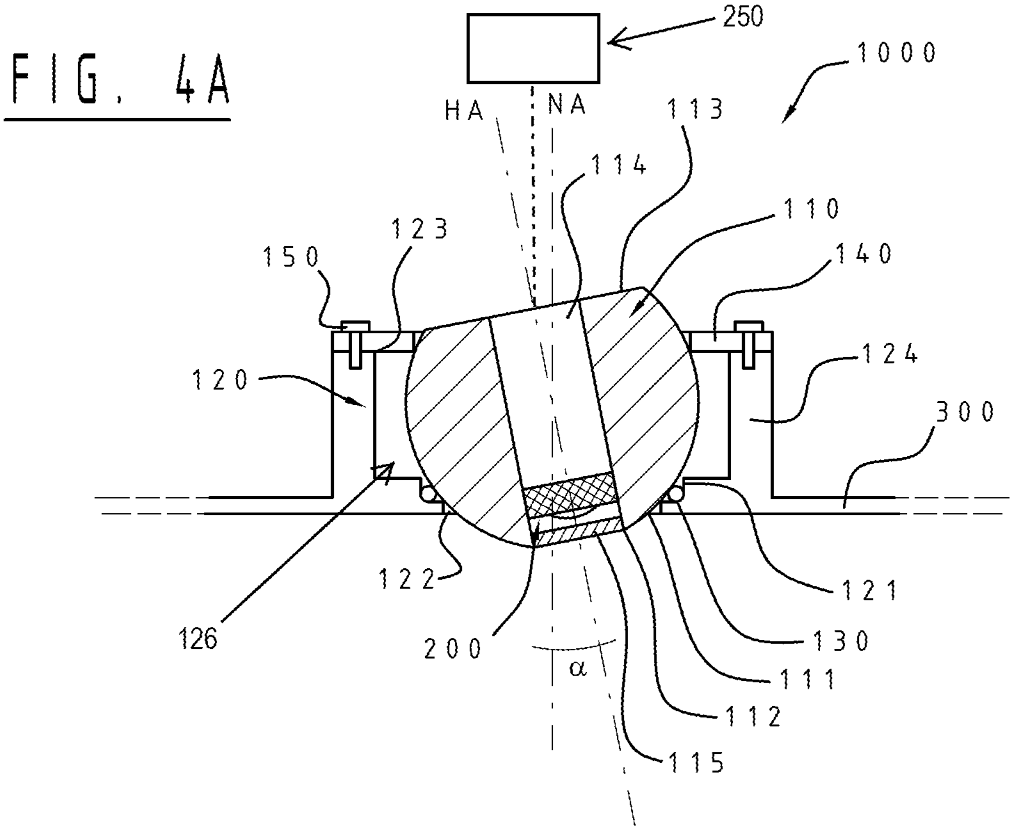
FIGS. 4A and 4B show cut side views of a holder orientated in different positions in a luminaire system according to the invention.
Figure 4B:
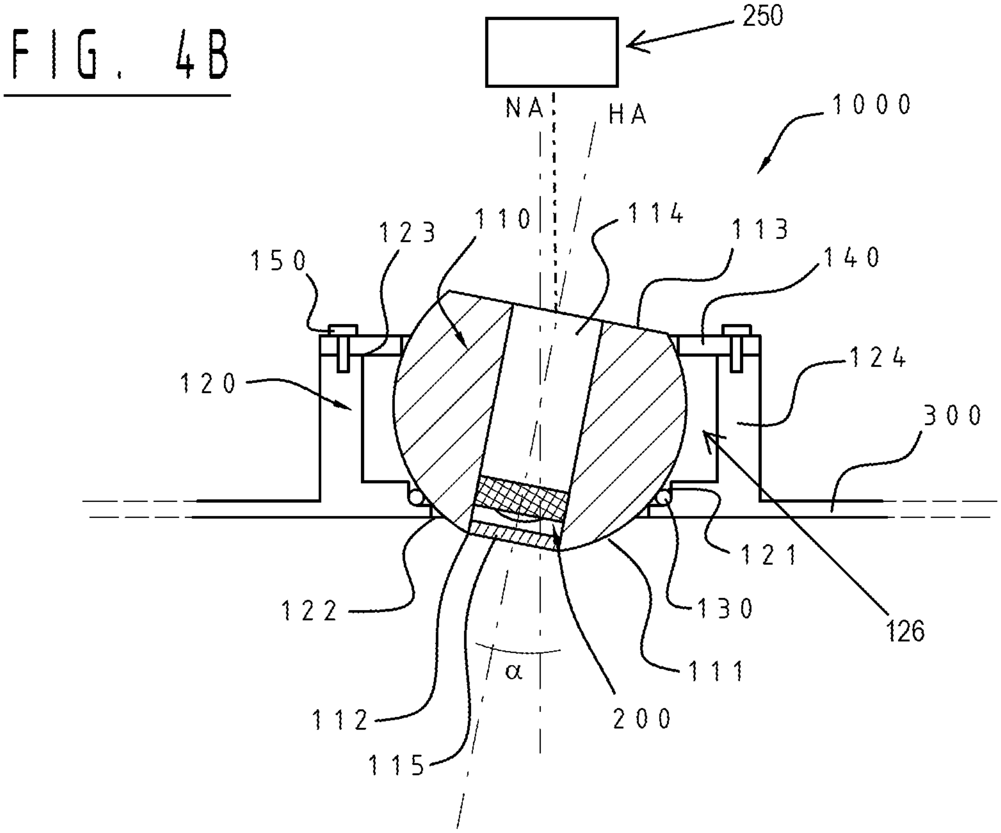

FIGS. 4A and 4B show cut side views of a holder orientated in different positions in a luminaire system according to the present invention. The luminaire system 1000 comprises a seat 120 provided to a casing 300 and a holder 110 configured for being mounted in the seat 120.

In FIGS. 4A and 4B, the seat 120 is integrally formed as part of the casing 300. The seat 120 may have an outer end corresponding to an opening 122 in the external surface of the casing 300. The opening 122 may belong to a passage 126 of the seat 120 extending inwardly and may present a stepped profile substantially perpendicular with respect to the external surface of the casing 300. The stepped profile may define an inner surface 121 of the seat 120. The stepped profile in the embodiment of FIGS. 4A and 4B has two steps. It may be more than two steps in other embodiments. An axis passing through the center of the opening 122 and perpendicular to the external surface of the casing 300 defines a neutral axis NA. The stepped profile may be rotation symmetrical around the neutral axis NA and of increasing diameter as seen in an inward direction of the casing 300.

The seat 120 receives a holder 110. The holder 110 may have a circumferential portion of its external surface 111 being spherical to cooperate with the stepped profile. The holder 110 in the embodiment of FIGS. 4A and 4B is of spherical shape with a first and a second truncated end 112, 113 opposite each other. The diameter of the spherical shape portion of the holder 110 is larger than the diameter of the opening 122 of the seat 120 in order for the holder 110 to be retained by the seat 120. A square-shaped cavity 114 may extend from the first to the second truncated end 112, 113 of the holder. The first truncated end 112 designed to be facing out of the casing 300 may be closed by a cover 115 comprising a transparent portion and sealed from ingress by external elements. An axis passing by the centers of the first and the second truncated end 112, 113 defines the holder axis HA. In a resting mounted position of the holder 110 in the seat 120, the holder axis HA and the neutral axis NA coincide.

A sensor device 200 may be mounted in the cavity 114 of the holder 110. In the embodiment of FIGS. 4A and 4B, the sensor device 200 is a camera and is mounted in the cavity through the second truncated end 113 of the holder 110 such that the camera may capture images through the cover 115 placed over the first truncated end 112. When mounted in the seat 120, the holder 110 may protrude out of the casing 300.

An O-ring 130 may be placed on the first step of the stepped profile between the holder 110 and the inner surface 121 of the seat 120. The O-ring 130 prevents ingress from external elements in the casing 300 and may be designed to achieve an IP66 rating.

Due to its spherical circumferential external surface portion, the holder 110 may be moved to different positions in the seat 120. More specifically, in the embodiment of FIGS. 4A and 4B, the holder 110 may be rotated in the seat 120 such that the holder axis HA presents an angle α with respect to the neutral axis NA. In FIG. 4A, the holder 110 has been rotated anti-clockwise with respect to the seat 120, and rotated clockwise in FIG. 4B. The arc described by the angle α may be up to 20°, preferably at least up to 45°. Similarly, the holder 110 may be rotated in and out of the plane of the cut-side view of FIGS. 4A and 4B. In that way, the camera 200 may be orientated to face different directions. A light source (not shown) part of the luminaire system 1000 may assist the image-capturing by the camera 200 when natural light falls below a predetermined level.

The seat 120 may comprise an inner wall 124 surrounding the holder 110 in a mounted position and extending inwardly. A locking means 140, a ring element in the embodiment of FIGS. 4A and 4B, may be mounted on top of the inner wall 124 with fixing means 150 to allow locking the holder 110 in the chosen position. In the embodiment of FIGS. 4A and 4B, a user may have to remove the locking means 140 and change the position of the holder 110 in the seat 120 manually before locking it again. In another embodiment, the holder 110 may be coupled to a moving means 250 such that the holder position may be changed remotely by the user and/or in response to a sensor signal sensed.

Figure 5:
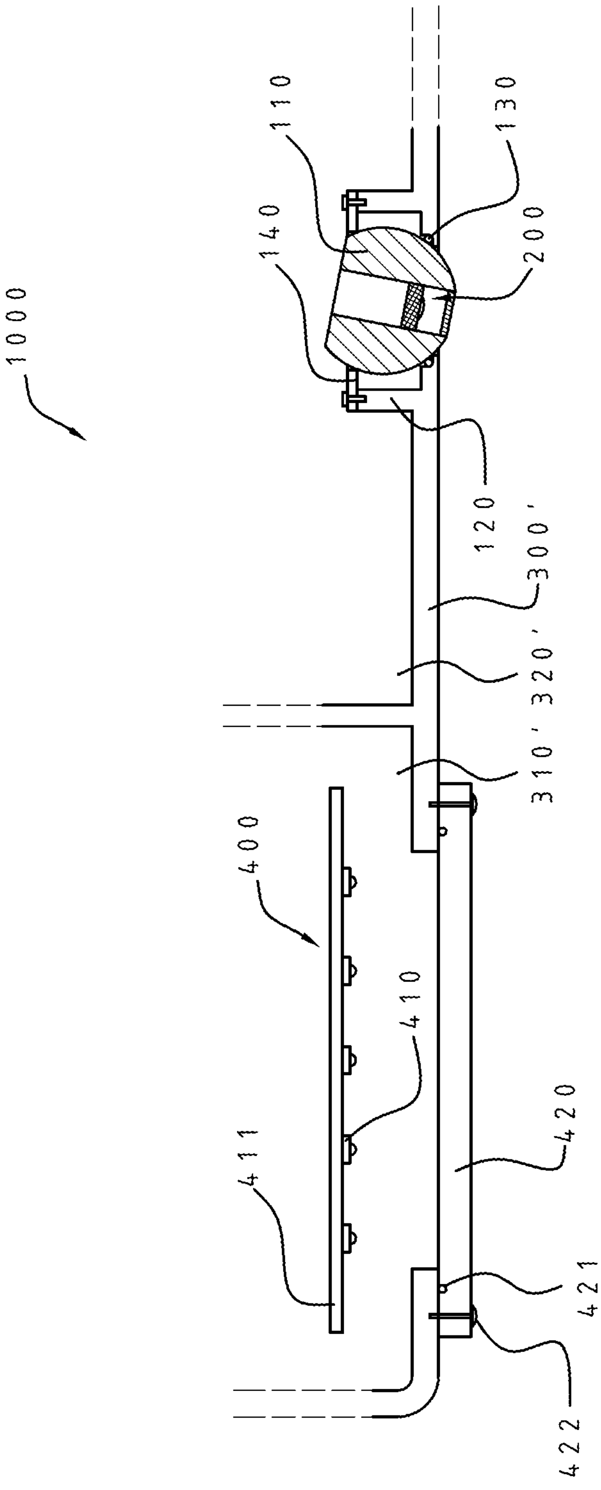
FIG. 5 illustrates a cut side view of an exemplary embodiment of a luminaire system with a luminaire casing according to the invention.

FIG. 5 illustrates a cut side view of an exemplary embodiment of a luminaire system with a luminaire casing according to the present invention. The luminaire system 1000 comprises a seat 120 provided to a casing 300' and a holder 110 configured for being mounted in the seat 120. Embodiments of the luminaire system 1000 described with references to FIGS. 1A through 4B, although omitted for convenience of description, are applicable to the embodiment of FIG. 5.

The casing 300' illustrated in FIG. 5 is a luminaire casing. The luminaire casing 300' may correspond to the casing of a luminaire head or to the casing of a base support, the casing of the luminaire head in the exemplary embodiment of FIG. 5. The luminaire head may be attached to a base support. The luminaire head attached to the base support forms a luminaire. Preferred embodiments relate to a luminaire casing for an outdoor luminaire. By outdoor luminaire, it is meant luminaires which are installed on roads, tunnels, industrial plants, campuses, parks, cycle paths, pedestrian paths, or in pedestrian zones for example, and which can be used notably for the lighting of an outdoor area, such as roads and residential areas in the public domain, private parking areas and access roads to private building infrastructures, etc.

The luminaire system 1000 comprises a light source 400. The light source 400 of the luminaire system may comprise a plurality of light sources 410 arranged on a lighting support 411. The plurality of light sources 410 may comprise a plurality of LEDs. Further each light source 410 may comprise a plurality of LEDs, more particularly a multi-chip of LEDs. The LEDs may be disposed on a PCB. The plurality of light sources 410 could also be light sources other than LEDs, e.g. halogen, incandescent, or fluorescent lamp.

The light source 400 of the luminaire system 1000 may be arranged outside the holder 110, at a distance away from the holder 110. Thereby, the light source 400 and the holder 110 may be independent from a structural point of view and/or from an operating point of view. In the embodiment of FIG. 5, the luminaire casing 300' comprises a first compartment 310' and a second compartment 320', said first and second compartment 310', 320' being sealed from each other. The light source 400 may be comprised in the first compartment 310' of the casing and the holder 110 in the second compartment 320' of the casing to allow independent access to the light source 400 and to the holder 110.

The light source 400 of FIG. 5 is located inside the casing 300' such that it faces an opening in the casing 300'. An optical window 420 may be arranged over the opening with a sealing means 421 surrounding the opening and mounted in between the optical window 420 and an external surface of the casing 300' in order to achieve sealing between the optical window 420 and the casing 300'. In another embodiment, the light source 400 may be comprised in a lighting module mounted on an external surface of the luminaire casing 300' such that, when mounted on the luminaire casing 300', the lighting module is sealed.

The seat 120 may be provided to the casing 300' or may be integral to the casing 300' such that the seat 120 and at least a portion of the casing 300' are made in one piece, integral to the casing 300' in the embodiment of FIG. 5. The integration of the seat 120 as part of the luminaire casing 300', in addition to the sealing means 130 between the holder 110 and the seat 120, may allow having a luminaire system 1000 with an orientable functional module 200 while preserving the water-sealed integrity of the luminaire casing. Depending on the nature of the functional module 200, the holder 110 may be oriented towards or away from the area illuminated by the light source 400 in order to take advantage or avoid the additional light from the light source 400 with respect to the ambient light.

Whilst the principles of the invention have been set out above in connection with specific embodiments, it is to be understood that this description is merely made by way of example and not as a limitation of the scope of protection which is determined by the appended claims.

The invention claimed is:

1. A luminaire system comprising:

a light source;

a holder;

a functional module provided to the holder, said holder holding the functional module, said functional module being separate from the light source;

a luminaire casing provided with a seat for receiving the holder, wherein the holder is configured for being positioned in different positions in the seat, wherein the seat has an opening in an external surface of the luminaire casing, wherein the functional module comprises a sensor device, an emitting device, a receiving device, or a display device, and wherein the light source is arranged outside the holder, in or on the luminaire casing; and a locking means configured for, after having positioned the holder in the seat, locking the positioned holder with respect to the seat.

2. The luminaire system of claim 1, wherein the seat comprises a passage having an inner surface extending between an outer end and an inner end, said inner end being adjacent to an inner part of the casing, wherein the outer end is narrower than the inner end, wherein: (i) a rotation-symmetrical circumferential inner surface portion of the passage cooperates with a spherical circumferential outer surface portion of the holder or (ii) a spherical circumferential inner surface portion of the passage cooperates with a rotation-symmetrical circumferential outer surface portion of the holder, and wherein a portion of the holder protrudes through the outer end in a mounted position of the holder in the seat.

3. The luminaire system of claim 2, wherein a sealing means is provided on the inner surface portion of the passage cooperating with the outer surface portion of the holder.

4. The luminaire system according to claim 3, wherein the circumferential inner surface portion of the passage has a stepped profile, and wherein the sealing means comprises at least one seal provided to at least one step surface of the stepped profile.

5. The luminaire system of claim 1, further comprising a sealing means arranged for providing sealing between the holder and the seat in the different positions, wherein the sealing means comprises at least one O-ring.

6. The luminaire system according to claim 1, wherein the holder is configured for being rotated in a mounted position of the holder along at least a 20°-arc around a first rotating axis and for being rotated along at least a 20°-arc around a second rotating axis.

7. The luminaire system according to claim 1, wherein a portion of the holder is located outside of the casing in a mounted position of the holder.

8. The luminaire system according to claim 1, wherein the holder has a cavity configured for containing the functional module, said cavity comprising a window for being transparent to predetermined signals in a mounted position of the holder.

9. The luminaire system according to claim 1, wherein the holder is transparent to predetermined signals.

10. The luminaire system according to claim 1, wherein the locking means comprises a circular opening for cooperating with a spherical circumferential outer surface portion of the holder.

11. The luminaire system according to claim 1, further comprising:

a moving means configured for moving the holder from a first position to a second position; and a controller configured for:

controlling the sensing, emitting, displaying, or receiving of predetermined signals by the functional module; and controlling the light source or the moving means based on the sensed, emitted, displayed, or received predetermined signals.

12. The luminaire system according to claim 1, wherein the light source is arranged inside the luminaire casing, and wherein the holder is arranged inside the luminaire casing when received by the seat.

13. The luminaire system according to claim 1, wherein the seat provided to the casing is a seat integral to the casing.

14. The luminaire system according to claim 1, wherein the seat is integrated in the luminaire casing.

15. The luminaire system according to claim 1, wherein the holder has an external surface configured to cooperate with the seat such that said opening is closed off from within the luminaire casing when the holder is positioned in the seat.

16. A luminaire system comprising:

a light source;

a holder;

a functional module provided to the holder, said holder holding the functional module, said functional module being separate from the light source;

a luminaire casing provided with a seat for receiving the holder, wherein the holder is configured for being positioned in different positions in the seat, wherein the seat has an opening in an external surface of the luminaire casing, wherein the seat includes an inner wall surrounding the holder in a mounted position and extending inwardly, and wherein the light source is arranged outside the holder, in or on the luminaire casing; and a locking means mounted on top of the inner wall with fixing means to allow locking the holder.

17. A luminaire system comprising:

a light source;

a holder;

a functional module provided to the holder, said holder holding the functional module, said functional module being separate from the light source; and a luminaire casing including a first compartment and a second compartment, the light source being comprised in the first compartment, and the second compartment being provided with a seat for receiving the holder, wherein the holder is configured for being positioned in different positions in the seat, wherein the seat has an opening in an external surface of the luminaire casing, wherein the functional module comprises a sensor device, an emitting device, a receiving device, or a display device, wherein a sealing means is arranged for providing sealing between the holder and the seat in the different positions, wherein the sealing means comprises at least one O-ring, and wherein the light source is arranged in or on the luminaire casing.

* * * * *